United States Patent
Yujiri

(10) Patent No.: US 9,641,772 B2
(45) Date of Patent: May 2, 2017

(54) COMPACT PMMW CAMERA CALIBRATION TARGET

(71) Applicant: NORTHROP GRUMMAN SYSTEMS CORPORATION, Falls Church, VA (US)

(72) Inventor: Mikio Larry Yujiri, Manhattan Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 190 days.

(21) Appl. No.: 14/547,738

(22) Filed: Nov. 19, 2014

(65) Prior Publication Data

US 2016/0142652 A1 May 19, 2016

(51) Int. Cl.
| | | |
|---|---|---|
| *G01J 5/00* | (2006.01) | |
| *H04N 5/33* | (2006.01) | |
| *G01J 5/08* | (2006.01) | |
| *H04N 17/00* | (2006.01) | |

(52) U.S. Cl.
CPC .............. *H04N 5/33* (2013.01); *G01J 5/0803* (2013.01); *H04N 17/002* (2013.01); *G01J 2005/0048* (2013.01)

(58) Field of Classification Search
CPC .............................................. G01J 2005/0048
See application file for complete search history.

(56) References Cited

U.S. PATENT DOCUMENTS

| | | | | |
|---|---|---|---|---|
| 5,023,459 | A | * 6/1991 | Osborn | F25B 21/02 250/332 |
| 5,760,397 | A | * 6/1998 | Huguenin | H01Q 19/06 250/332 |
| 5,789,622 | A | 8/1998 | Quon et al. | |
| 6,404,397 | B1 | 6/2002 | Grinberg et al. | |
| 6,563,462 | B1 | 5/2003 | Moffa et al. | |
| 6,828,556 | B2 | 12/2004 | Pobanz et al. | |
| 6,900,756 | B2 | 5/2005 | Salmon | |
| 7,132,649 | B2 | 11/2006 | Vaidya | |
| 7,358,497 | B1 | 4/2008 | Boreman et al. | |
| 7,432,846 | B2 | 10/2008 | Martin et al. | |
| 7,795,583 | B1 | 9/2010 | Hubbard et al. | |

(Continued)

OTHER PUBLICATIONS

Kumar, Ajay, "Sensor Non Uniformity Correction Algorithms and its Real Time Implementation for Infrared Focal Plane Array-based Thermal Imaging System" Defence Science Journal, vol. 63, No. 6, Nov. 2013, pp. 589-598.

(Continued)

*Primary Examiner* — Edwin Gunberg
(74) *Attorney, Agent, or Firm* — John A. Miller; Miller IP Group, PLC

(57) ABSTRACT

A calibration system for a passive millimeter-wave (PMMW) camera. The calibration system includes a thermal calibrator having a first thermally conducting body, a second thermally conducting body, a first black body target mounted to a front surface of the first conducting body, a second black body target mounted to a front surface of the second conducting body, and a thermo-electric (TE) cooling device having a hot side and a cold side. The hot side of the TE cooling device is thermally attached to the first conducting body and the cold side of the TE cooling device is thermally attached to the second conducting body.

20 Claims, 3 Drawing Sheets

(56) References Cited

U.S. PATENT DOCUMENTS

| | | |
|---|---|---|
| 7,889,113 B2 | 2/2011 | Cardiasmenos et al. |
| 8,049,163 B1 | 11/2011 | Granneman et al. |
| 8,373,757 B1 | 2/2013 | Nguyen |
| 8,378,290 B1 | 2/2013 | Speake et al. |
| 2009/0272888 A1 | 11/2009 | Nugent et al. |
| 2012/0007987 A1 | 1/2012 | Gaber |
| 2013/0147966 A1 | 6/2013 | Kostrzewa et al. |

OTHER PUBLICATIONS

Luukanen, Arttu, "Passive real-time submillimetre-wave imaging system utilizing antenna-coupled microbolometers for stand-off security screening applications" IEEE 2010, 4 pgs.

Frontera, Filippo, "Passive Millimeter Wave Imagine Camera ViKy as Technology Transfer of Planck-LFI", Settore Scientifico Disciplinare FIS/01 2006/2008, 162 pgs.

Williams, George M., "Dual-Band MWIR/LWIR Radiometer for Absolute Temperature Measurements" SPIE Thermosense Conference XXVIII—Pre-release Manuscript 6502-23, 13 pgs.

Liangchao, Li, "An Focal Plane Array Space Variant Model for PMMW Imaging" IET International Radar Conference, Apr. 2009, China, 4 pgs.

\* cited by examiner

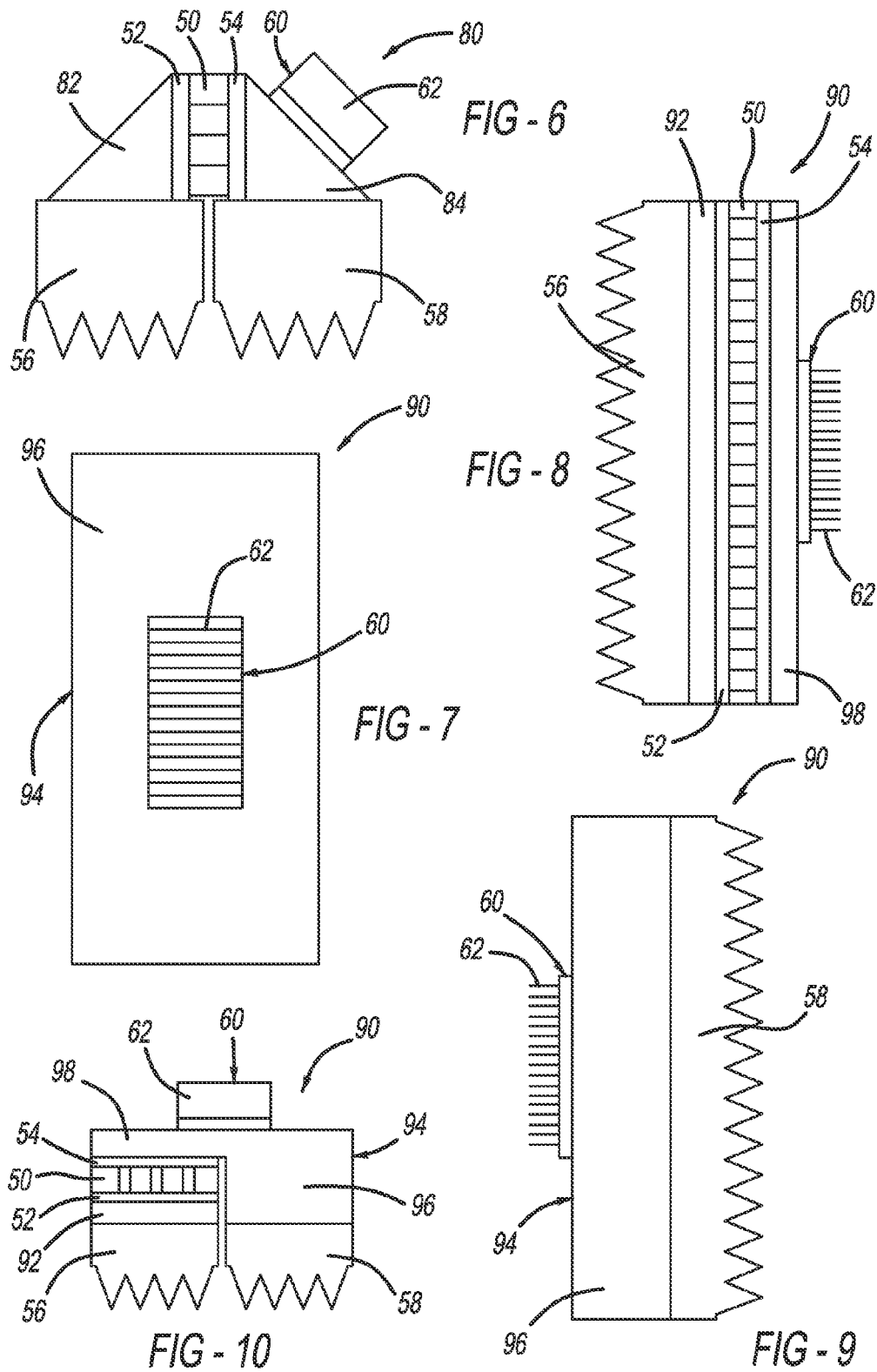

COMPACT PMMW CAMERA CALIBRATION TARGET

BACKGROUND

Field

This invention relates generally to a thermal calibrator for calibrating a camera and, more particularly, to a thermal calibrator for calibrating a passive millimeter wave (PMMW) camera, where the calibrator includes two thermally conducting blocks separated by a thermo-electric (TE) cooling device that cools one of the blocks and heats the other block to provide calibration targets at hot and cold temperatures, and where the target is selectively scanned across a focal plane array (FPA) in the camera.

Discussion

PMMW cameras are well known in the art that passively receive and process millimeter wave radiation from a scene and provide imaging through thermal resolution of objects in the scene. Certain millimeter wave frequencies in the millimeter wave radiation band of 20-300 GHz, such as 35 GHz, 94 GHz, 140 GHz and 220 GHz, are not significantly attenuated by smoke, fog, clouds, etc. in the air, and thus provide radiation that can be detected for scene imaging purposes when visible light imaging cannot be used. For example, aircraft can employ PMMW cameras to detect runways through clouds, smoke and fog.

A typical PMMW camera that detects and images radiation in these frequency bands often includes a focal plane array (FPA) that converts the radiation into an electric signal, where a lens focuses the radiation onto the array. The FPA typically includes a configuration of a plurality of receivers positioned in a two-dimensional plane, where each of the receivers includes an antenna or signal horn having a pick-up probe at the front end that converts the radiation to an electrical signal that is amplified by a millimeter integrated circuit (MMIC) low noise amplifier. A diode at the back end of the each receiver rectifies the amplified voltage signal to a DC signal, where the DC signal amplitude is representative of the power level of the received signal, which increases as the radiometric temperature of the object being imaged increases, and where power and temperature are proportional to each other. The DC voltage signal from each receiver is then digitized and converted to an image, where higher voltages are displayed as whiter areas in the image representing warmer objects with higher radiometric temperature.

The relationship of the receiver DC signal voltage $V_{output}$ to the scene temperature $T_{scene}$ is given by equation (1) below. The calibration involves obtaining a gain and offset value for each receiver that allows the conversion of the receiver output voltage into a scene radiometric temperature that can be converted into a gray scale for display. Particularly, the gain and DC offset of each receiver are typically not the same. If a receiver views two calibration targets having temperatures $T_1$ and $T_2$, and produces output voltages $V_1$ and $V_2$, respectively, the associated receiver gain and offsets are defined in equations (2) and (3), respectively.

$$V_{output} = \text{GAIN} * T_{scene} + V_{offset}, \tag{1}$$

where:

$$\text{GAIN} = (V_2 - V_1)/(T_2 - T_1), \tag{2}$$

$$V_{offset} = V_1 \text{GAIN} * T_1. \tag{3}$$

Therefore, a calibration technique is required to calibrate each of the receivers so that they provide the same voltage level for the same power of the incoming radiation. Known calibration techniques for PMMW receivers include placing a black body target, such as a target that is cooled to the temperature of liquid nitrogen, in front of the FPA that is representative of the coldest value that the receivers could receive and then identifying the specific voltage level for each receiver for that target temperature so that each receiver has a calibration factor for the low temperature. The calibration technique also includes placing a warm target in front of the FPA, such as at room temperature, and providing a calibration factor for each DC voltage level provided by each receiver for the warm target temperature.

Each receiver will respond to different signal power levels in a linear manner so that a line between the cold calibration target temperature point and the hot calibration target temperature point represents a calibration curve for that receiver. The gain and offset for each receiver is then determined from this calibration curve, as defined by equations (2) and (3). This process for calibrating the receivers in an FPA would need to be performed as often as required depending on the drift of the receivers in the array. The FPA drift may be a result of temperature changes in the environment, and the calibration curve for each receiver would need to be updated for the new receiver temperature. For example, if the camera is mounted on an aircraft, it will experience significant temperature changes for different altitudes of the aircraft.

These known calibration techniques that require hot and cold targets sometimes require that these targets be mechanically moved in front of the FPA during the calibration process. For a PMMW camera with a large field-of-view, an FPA operating in the MMW, with elements placed in a Cartesian arrangement, can be on the order of 10 cm×10 cm. Thus, providing two targets having the same size as the FPA that need to be selectively and independently moved in front of the FPA during calibration and then moved away from the FPA during detection and imaging requires size and space requirements that are somewhat prohibitive.

BRIEF DESCRIPTION OF THE DRAWINGS

FIG. 6 is an end view of another temperature target calibrator including right-angle wedge shaped thermally conducting blocks;

FIG. 7 is a back view of a temperature target calibrator according to another embodiment;

FIG. 8 is one side view of the calibrator shown in FIG. 7;

FIG. 9 is an opposite side view of the calibrator shown in FIG. 7; and

FIG. 10 is an end view of the calibrator shown in FIG. 7.

DETAILED DESCRIPTION OF THE EMBODIMENTS

The following discussion of the embodiments of the invention directed to a temperature target calibrator is merely exemplary in nature, and is in no way intended to limit the invention or its applications or uses. For example, the temperature target calibrator discussed below is described as having particular application for a PMMW camera. However, as will be appreciated by those skilled in the art, the temperature target calibrator may have application for other types of cameras, such as infrared cameras or cameras operating in the terahertz regime.

Figure 1:
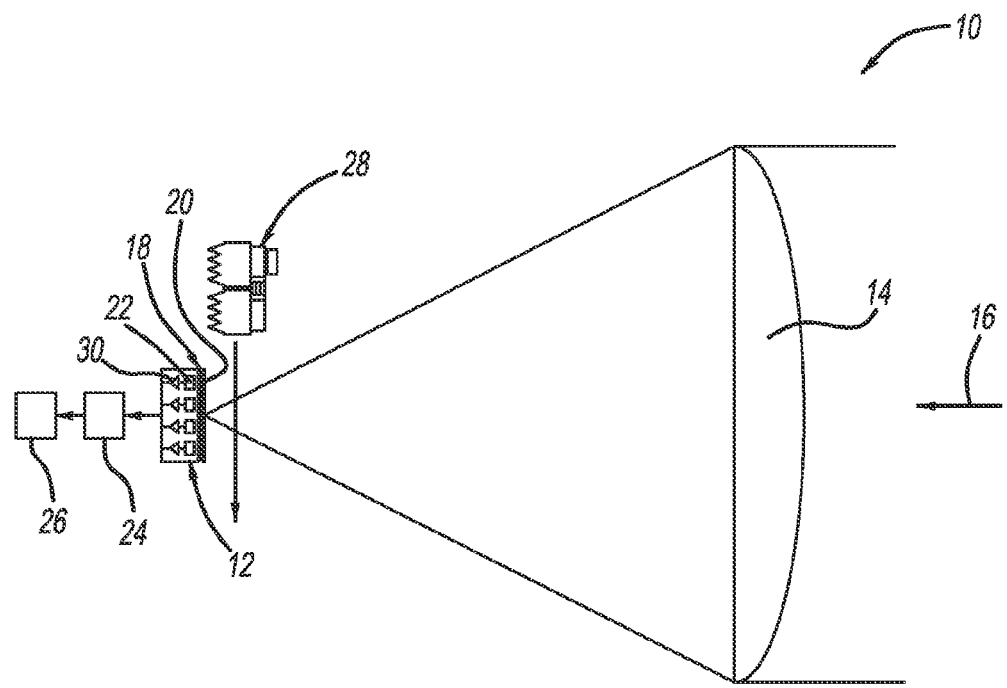
FIG. 1 is a simple illustration of a PMMW camera including a compact calibration target.

FIG. 1 is a simplified illustration of a PMMW camera 10 including an FPA 12 and an objective lens 14 that receives millimeter wave radiation 16 from a scene that the camera 10 is directed towards and focuses the radiation 16 onto the FPA 12. The FPA 12 includes a number of receivers 18 each including an antenna feed horn 20, an MMIC chip 22 and a diode 30. As discussed above, the MMIC chip 22 in each of the receivers 18 amplifies the power from the antenna feed horn 20 and the diode 30 converts it into a voltage level that is sent to back-end electronics 24 that converts the voltage level from each of the receivers 18 to a digital signal that is processed to be displayed as an image on a display 26.

As will be discussed in detail below, the camera 10 includes a thermal calibrator 28 that is selectively movable in front of the FPA 12 to provide hot and cold temperature calibration targets for calibrating the FPA 12, where the radiation 16 is blocked from the array 12 during the calibration process. The calibrator 28 includes two thermally conducting blocks separated by a thermo-electric (TE) cooling device that heats one of the blocks and cools the other block. As is well understood by those skilled in the art, a TE cooling device is a well known solid state device that when it receives a voltage potential uses the Peltier effect to create a heat flux between the junction of two different types of materials so that heat is transferred from one side of the device to the other side, and thus one side of the device is cold and the other side of the device is hot.

Figure 2:
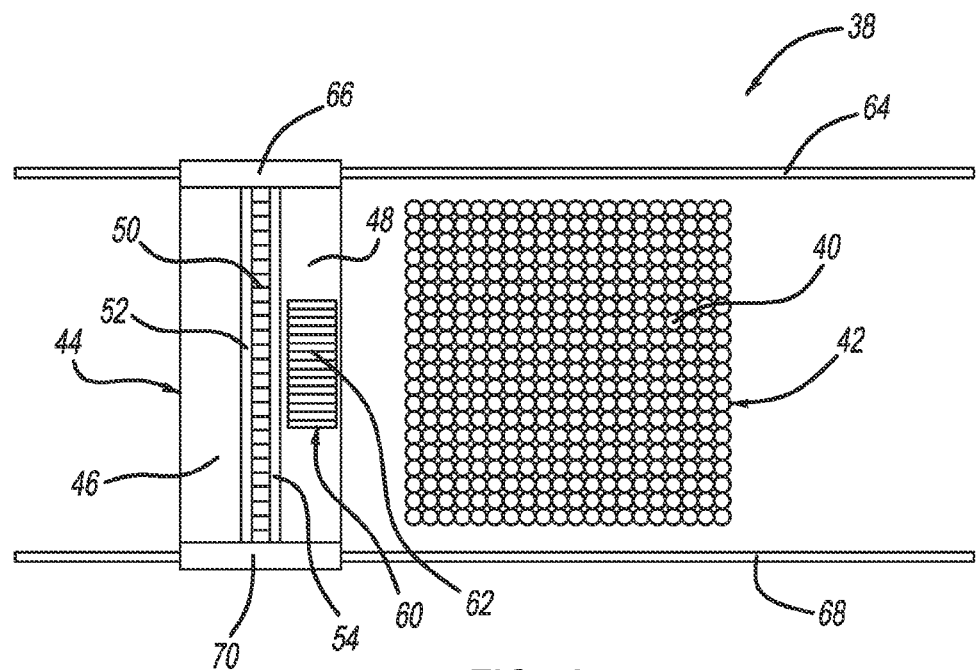
FIG. 2 is a front view of a calibration system including a temperature target calibrator slidably movable in front of an FPA.
Figure 3:
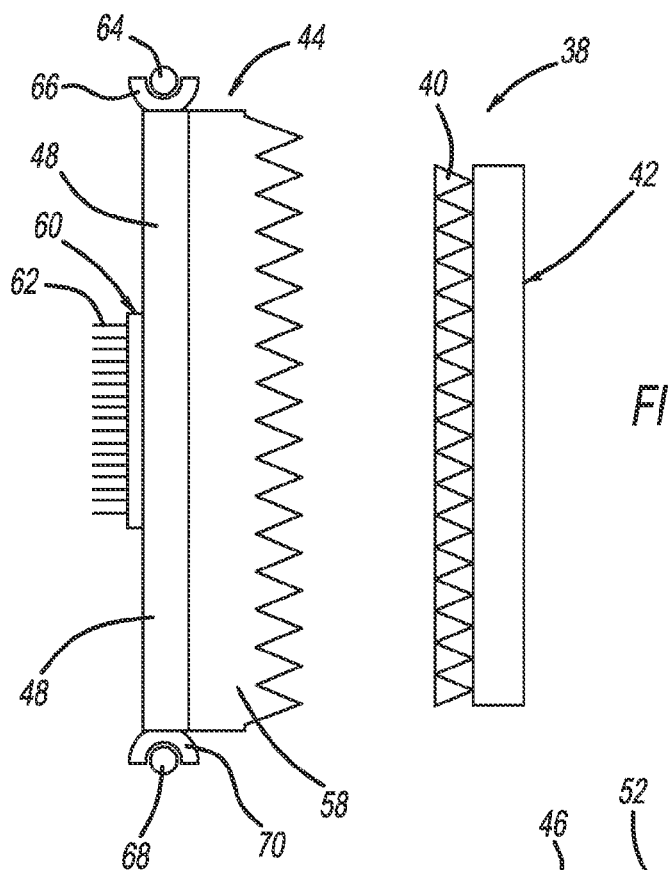
FIG. 3 is a side view of the system shown in FIG. 2.
Figure 4:
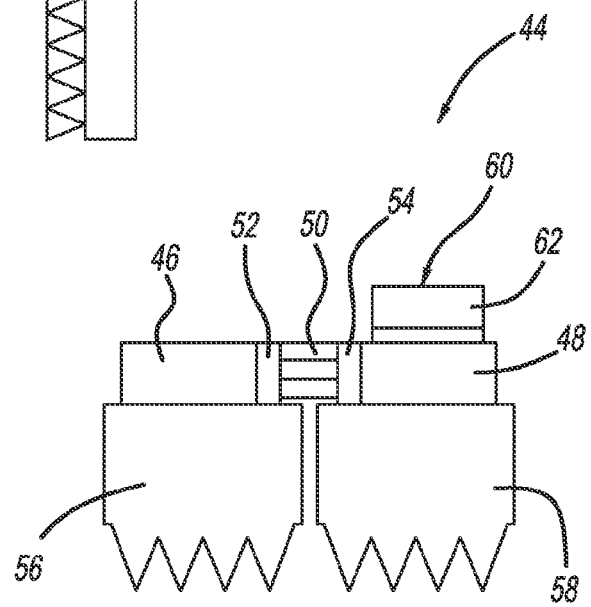
FIG. 4 is an end view of the target calibrator in the system shown in FIG. 2.

FIG. 2 is a front view and FIG. 3 is a side view of a calibration assembly 38 for a PMMW camera including an FPA 42 having feed horns 40 and a thermal calibrator 44 of the type discussed above. An end view of the calibrator 44 is shown separated from the assembly 38 in FIG. 4. The calibrator 44 includes a cold thermally conducting block 46 and a hot thermally conducting block 48 having a TE cooling device 50 positioned therebetween, where the cooling device 50 receives a voltage signal from a voltage source (not shown). A thermo-electric cooling device can be configured into any desirable shape for a particular system. The TE cooling device 50 can be a single elongated device or a plurality of separate and spaced apart devices. A side surface of the conducting block 46 is thermally mounted to the cold side of the TE cooling device 50 by a thermally conductive adhesive layer 52 and a side surface of the conducting block 48 is thermally mounted to the hot side of the TE cooling device 50 by a thermally conductive adhesive layer 54. Further, a black body target 56 is mounted to a front surface of the block 46 and a black body target 58 is mounted to a front surface of the block 48. The TE cooling device 50 cools the thermally conducting block 46, which in turn cools the target 56 to a known very low temperature so that it acts as a low temperature radiation source, and the TE cooling device 50 heats the thermally conducting block 48, which in turn heats the black body target 58 to a known high temperature so that it acts as a high temperature radiation source. The targets 56 and 58 can be any suitable radiating black body target many of which are known to those skilled in the art, such as a foam material including embedded iron particles. A radiator 60 having fins 62 is mounted to a back surface of the conducting block 48 so as to prevent the conducting block 48 from becoming too hot as a result of the thermo-electric process.

A top end of the calibrator 44 is slidably mounted to a top track 64 by a track guide 66 and a bottom end of the calibrator 44 is slidably mounted to a bottom track 68 by a track guide 70. A motor (not shown), or other suitable actuation device, is used to scan the calibrator 44 across the front of the FPA 42 at the appropriate speed for calibrating each of the receivers in the FPA 42. At any particular point in time, a group of the receivers in the FPA 42 will be receiving radiation from either the cold target 56 or the hot target 58, and as the calibrator 44 moves, calibration points for the receivers can be provided. In one non-limiting embodiment, the front face of the calibrator 44 can be less than the size of the front face of the FPA 42, for example, about one-half the size of the FPA 42.

Figure 5:
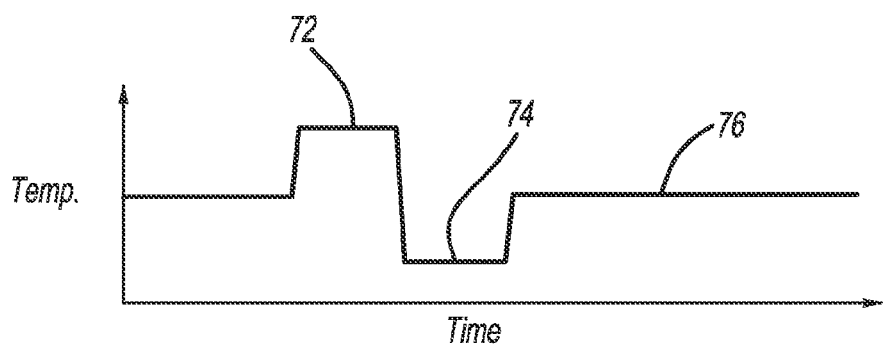
FIG. 5 is a graph with time on the horizontal axis and temperature on the vertical axis showing a temperature response over time of a single receiver in the FPA due to the motion of the compact calibrator in front of the receiver.

FIG. 5 is a graph with time on the horizontal axis and temperature on the vertical axis showing a temperature-time history relationship that occurs during a calibration process for one of the receivers in the FPA 42. Line segment 72 represents the time that the hot target 58 is passing in front of the receiver and line segment 74 represents the time that the cold target 56 is passing in front of the receiver. Line segment 76 represents the radiation being received from the scene.

The design of the calibrator 44 discussed above is one way of providing the calibrator including a TE cooling device. Alternate techniques can also be provided. For example, the thermally conducting blocks 46 and 48 have a rectangular shape in the calibrator 44. However, other shapes can be provided in other designs.

FIG. 6 is an end view of a calibrator 80 similar to the calibrator 44, where like elements are identified by the same reference number. In this design, the rectangular shaped conducting blocks 46 and 48 are replaced with right-angle wedge shaped conducting blocks 82 and 84, respectively, to provide a different, and possibly more compact, design for a particular camera housing configuration.

FIG. 7 is a back view, FIG. 8 is one side view, FIG. 9 is an opposite side view and FIG. 10 is an end view of another design of a calibrator 90, where like elements to the calibrator 44 are identified by the same reference numbers. In this design, the thermally conducting block 46 is replaced with a thermally conducting interface plate 92 and the thermally conducting block 48 is replaced with an L-shaped thermally conducting block 94 having a main portion 96 to which the black body target 58 is attached and a portion 98 to which the TE cooling device 50 is mounted. An opposite side of the TE cooling device 50 is adhered to the conducting interface plate 92 opposite to the black body target 56.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A calibration system for a camera, said calibration system comprising a thermal calibrator including a first thermally conducting body, a second thermally conducting body, a first black body target mounted to a back surface of the first conducting body, a second black body target mounted to a back surface of the second conducting body, and a thermo-electric (TE) cooling device having a hot side and a cold side that are on opposite sides of the device from each other, wherein the hot side of the TE cooling device is thermally attached to the first conducting body and the cold side of the TE cooling device is thermally attached to the second conducting body.

2. The calibration system according to claim 1 further comprising a first track and a second track, said thermal calibrator further including a first track guide mounted to one end of the calibrator and a second track guide mounted to an opposite end of the calibrator so as to allow the calibrator to be slidably positionable along the tracks.

3. The calibration system according to claim 1 wherein the first thermally conducting block is thermally attached to the TE cooling device by a thermal adhesive layer and the second thermally conducting block is thermally attached to the TE cooling device by a thermal adhesive layer.

4. The calibration system according to claim 1 wherein the first and second conducting blocks are rectangular shaped blocks.

5. The calibration system according to claim 1 wherein the first and second conducting blocks are right-angled wedge shaped conducting blocks.

6. The calibration system according to claim 1 wherein the first conducting block is an L-shaped block and the second conducting block is a conducting plate.

7. The calibration system according to claim 1 further comprising a radiator mounted to a back surface of the first conducting block opposite to the first black body target so as to dissipate heat.

8. The calibration system according to claim 1 wherein the camera is a passive millimeter-wave camera.

9. The calibration system according to claim 8 wherein the camera includes a focal plane array having a plurality of receivers, said calibrator being positioned in order to move across the front of the focal plane array.

10. The calibration system according to claim 9 wherein a front face of the calibrator is less than the size of a front face of the focal plane array.

11. The calibration system according to claim 9 wherein the front face of the calibrator is one-half the size of the front face of the focal plane array.

12. A passive millimeter-wave (PMMW) camera comprising:
a focal plane array (FPA) including a plurality of receivers each including a feed horn;
a thermal calibrator including a first thermally conducting body, a second thermally conducting body, a first black body target mounted to a front surface of the first conducting body, a second black body target mounted to a front surface of the second conducting body, and a thermo-electric (TE) cooling device having a hot side and a cold side that are on opposite sides of the device from each other, wherein the hot side of the TE cooling device is thermally attached to the first conducting body and the cold side of the TE cooling device is thermally attached to the second conducting body; and
a track positioned proximate to the FPA, said thermal calibrator being mounted to the track so as to be slidably positionable thereon, said track allowing the calibrator to be selectively moved in front of the FPA.

13. The camera according to claim 12 wherein a front face of the calibrator is equal to or less than the size of a front face of the focal plane array.

14. The camera according to claim 13 wherein the front face of the calibrator is one-half the size of the front face of the focal plane array.

15. The camera according to claim 12 wherein the first thermally conducting block is thermally attached to the TE cooling device by a thermal adhesive layer and the second thermally conducting block is thermally attached to the TE cooling device by a thermal adhesive layer.

16. The camera according to claim 12 wherein the first and second conducting blocks are rectangular shaped blocks.

17. The camera according to claim 12 wherein the first and second conducting blocks are right-angle wedge shaped conducting blocks.

18. The camera according to claim 12 wherein the first conducting block is an L-shaped block and the second conducting block is a conducting plate.

19. The camera according to claim 12 further comprising a radiator mounted to a back surface of the first conducting block opposite to the first black body target so as to dissipate heat.

20. A calibration system for a camera, said calibration system comprising a thermal calibrator including a first thermally conducting body, a second thermally conducting body, and a thermo-electric (TE) cooling device having a hot side and a cold side that are on opposite sides of the device from each other, wherein the hot side of the TE cooling device is thermally attached to the first conducting body and the cold side of the TE cooling device is thermally attached to the second conducting body.

* * * * *